July 27, 1926.

H. R. MORR ET AL 1,593,703

COLORED BALLOON AND METHOD OF MANUFACTURING SAME

Filed May 16, 1925

Harold R. Morr
and
George F. Morr
Joint Invent
by

Lester L. Sargent
Atto:

Patented July 27, 1926.

1,593,703

UNITED STATES PATENT OFFICE.

HAROLD R. MORR AND GEORGE F. MORR, OF ASHLAND, OHIO.

COLORED BALLOON AND METHOD OF MANUFACTURING SAME.

Application filed May 16, 1925. Serial No. 30,792.

The object of our invention is to provide a colored balloon having a multiplicity of colors applied in a novel manner on the surface of the balloon so as to become integral therewith and make it impossible to wash the color off from the completed article. It is an object of our invention to provide a novel method of manufacturing colored rubber toy balloons or other colored rubber articles, whereby the desired liquid colors are applied in irregular designs resembling camouflage painting and while the structure of the article is still in a fluid state. It is also our object to provide a method of manufacture by means of which a large variety of colors may be readily applied to rubber articles, such as balloons.

Figure 1:
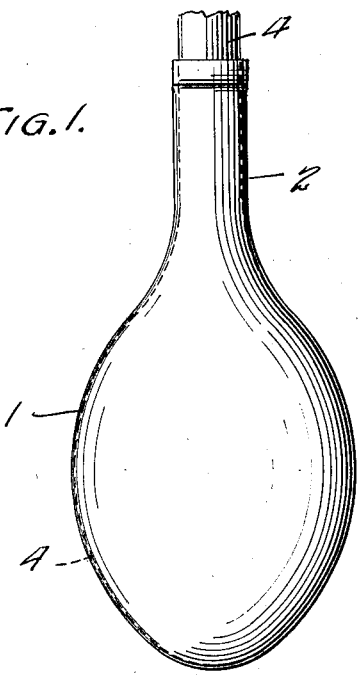
Figure 2:
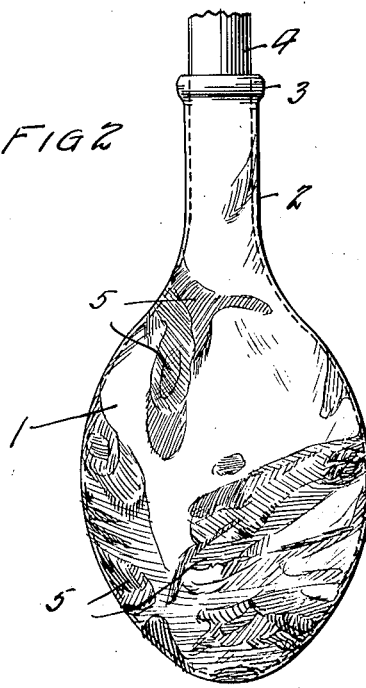

In the accompanying drawings:

Figure 1 is a view of the balloon as it appears prior to the application of the color; and Fig. 2 is a view of the completed balloon with the colors applied.

We utilize the conventional wooden form 4 which is dipped in the rubber solution to form the balloon 1, having the usual elongated neck 2 in which a stiffening rubber ring 3 is inserted by machinery. The variegated colors 5 shown in Fig. 2 are applied in the manner hereinafter described.

The usual steps in the manufacture of toy balloons are first carried out, that is, the crude rubber, and the coloring matter of the selected base color for the balloon is mingled together with naptha in an ordinary rubber milling machine for the required period to produce a colored rubber solution, which is of the single color adopted. The balloon is then produced by applying the rubber to the conventional balloon form, which is ordinarily a piece of wood of egg-shape with a stem formed on one end. The usual method of application is to dip the form in the rubber solution.

When this dipping has proceeded to the point where the desired amount of rubber has been applied to complete the balloon structure and while the rubber is still in a fluid state, the balloon is reversed from the position in which it is customarily suspended with the stem downward to a reversed position with the stem upward, in which position the fluid rubber will tend to flow back and distribute itself evenly over the body of the balloon. At this stage the several colors in a solution of rubber and aniline, with which the balloon is to be decorated, are applied from tubes containing the various colors in a liquid state. This application of colors is performed by hand and the colors are mingled together to form an ornamental disposition of the colors, preferably in irregular designs similar to the so-called camouflage painting. Immediately after the application of colors the forms are inverted back and forth several times to allow the colors to flow together and to mingle with the rubber while it is in a fluid state. This operation must be accomplished within a period of about ten minutes, as after that the rubber becomes hardened. The colors are thus indelibly intermingled with the rubber.

Subsequently, the balloons are dipped into a suitable acid to cure them, this latter step being a customary step in the manufacture of toy balloons. It is our opinion that we are the first to devise a toy balloon in which the color is indelibly run into the rubber so as to form an integral part of the balloon instead of being merely painted on its surface.

While the invention is primarily intended for producing ornamentally decorated toy balloons, it is within the contemplation of our invention to apply the process to other rubber articles.

What we claim is:

1. A colored balloon having a plurality of colors indelibly applied to the surface of the balloon in irregular designs in which the colors are run together resembling the so-called camouflage painting.

2. The method of manufacturing colored rubber articles consisting in producing the desired article on a form, and while the rubber is still in a fluid state applying to its surface the desired colors in fluid state.

3. The method of manufacturing colored rubber articles consisting in producing the desired article on a form, while the rubber is still in a fluid state applying to its surface the colors in fluid state, and inverting the article back and forth before the rubber hardens to cause the colors to mingle with each other and with the fluid rubber, and dipping the completed article in an acid to cure same.

4. The method of manufacturing toy colored rubber balloons, consisting in forming the balloons by dipping a form of the desired shape in the liquid rubber of the desired base color, and while the balloon is still in a fluid state applying to the surface other colors in a liquid form, inverting the form back and forth to cause the colors and the fluid rubber to flow together, and dipping the completed balloon in an acid to cure same.

HAROLD R. MORR.
GEORGE F. MORR.